(No Model.)
N. ROE.
PROPULSION DEVICE.
No. 584,896. Patented June 22, 1897.
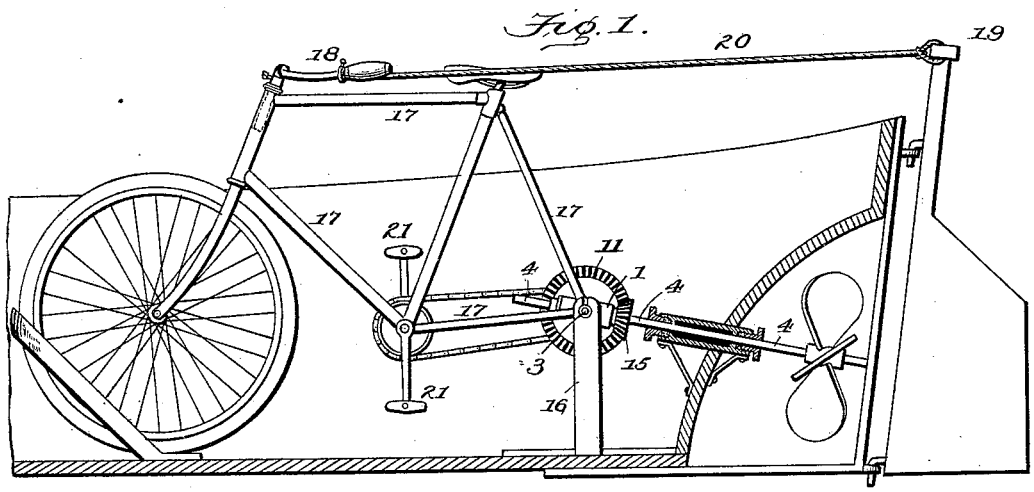
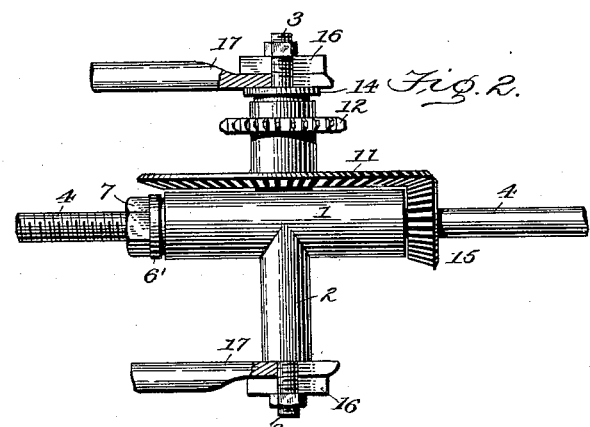
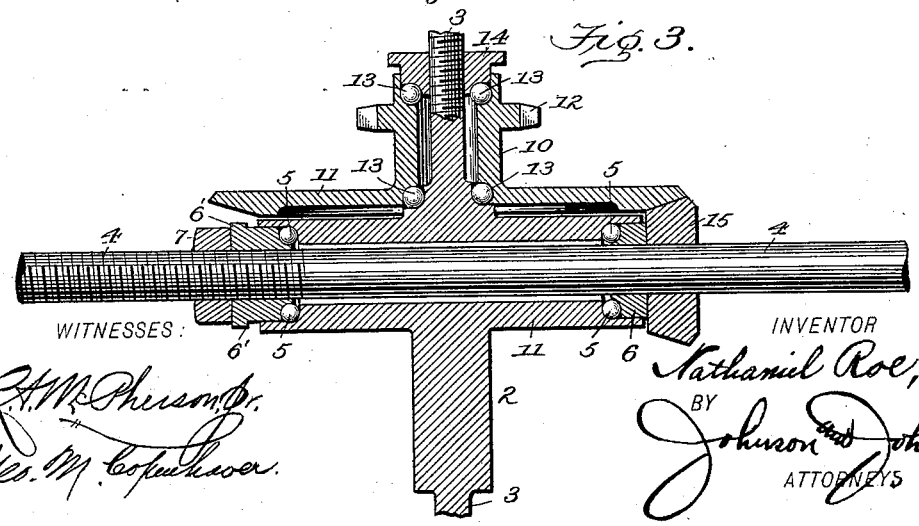
WITNESSES: INVENTOR
Nathaniel Roe,
BY Johnson and Johnson
ATTORNEYS

UNITED STATES PATENT OFFICE.

NATHANIEL ROE, OF PATCHOGUE, NEW YORK.

PROPULSION DEVICE.

SPECIFICATION forming part of Letters Patent No. 584,896, dated June 22, 1897.

Application filed March 26, 1897. Serial No. 629,366. (No model.)

*To all whom it may concern:*

Be it known that I, NATHANIEL ROE, a citizen of the United States, residing at Patchogue, in the county of Suffolk and State of New York, have invented a new and useful Improvement in Propulsion Devices, which I denominate the "Bicycle-Hub Power-Transmitter," of which the following is a specification.

My invention consists of a device for transmitting power applicable for any use for which it may be adapted, and may be operated by any suitable means, preferably by a sprocket-chain, and which I call the "bicycle-hub power-transmitter."

In the accompanying drawings I have shown my invention as applied for operating the propeller of a boat, but such illustration is only intended to be one form of the connections of the power-transmitter with coöperative driving and driven parts, which in the example is the treadle propelling and sprocket device of a bicycle and the propeller-shaft of a boat; but my invention is not confined to such use or to any particular use, but resides in the hub power-transmitter itself as a device applicable for numerous purposes, and a description of the particular application shown of the device for use is deemed unnecessary.

Referring to the drawings, Figure 1 shows the hub power-transmitter as applied in one way for use. Fig. 2 shows the hub power-transmitting device; and Fig. 3 shows the device in section enlarged, exposing the interior construction and the ball-bearings.

The device as a power-transmitter consists of a hub part 1, having arms 2 2 at right angles thereto and preferably mediately of the hub. These arms terminate in bearings 3 3, which may be screw-threaded to receive fastening-nuts. The hub part is tubular and forms the bearings and support for a shaft 4, which forms the power-transmitting part and preferably passes through the hub and is fitted upon ball-bearings 5 within and at each end of the hub. The seats for the balls are formed upon hardened collars 6 and 6' on the shaft and hardened seats formed within the ends of the hub, and to this hub-bearing the inner end of the shaft is secured by a nut 7, which is driven down upon the screw-collar 6', which is driven down upon the balls to bind the shaft upon its bearings and thereby render the connection of the shaft with the hub secure. This construction forms a long bearing for the power-transmitting part.

On one of the arms of the hub is loosely mounted a sleeve 10, which has a bevel-wheel 11 adjacent to the hub and a sprocket-wheel 12 outside of said wheel. This sleeve is mounted upon ball-bearings 13 at each end, the seats for the balls being hardened, and the sleeve is secured upon said bearings by a follower 14, screwed upon the arm into the end of the sleeve.

Adjacent to the hub a bevel-pinion 15 is fixed upon the shaft and engages the bevel-wheel, whereby the power from the driven sleeve is communicated to the shaft. The loose mounting of the gear-carrying sleeve upon the hub part allows the latter to be fixed at any angle and affords convenience in applying the shaft for use. The hub device gives a firm mounting for the sleeve and for the shaft and maintains the gear in firm working relation.

A sprocket-chain connects the sprocket-wheel of the sleeve and may be driven by any suitable mechanism or device, such as a sprocket treadle-motor. The rotation of the sleeve and the rotation of the shaft on ball-bearings gives to the device an easy working, while the hub that forms the bearings for these parts can be readily applied as a fixture in connecting it for use, as upon a fixed frame 16.

The seats for the ball-bearings may be steel cups set in place.

When the bicycle-frame 17 is mounted on the hub part, the steering-handle 18 is made loose and connected with the tiller-arms 19.

I claim as my invention—

1. The power-transmitting device substantially herein described, consisting of a fixed hub part having supporting-arms and a tubular bearing part transversely on said armed hub part, a shaft mounted to rotate in said tubular part and having a pinion, a sleeve loosely mounted on one of the hub-arms and having a gear-wheel engaging the shaft-pinion, and a sprocket-wheel, and means for securing the shaft and the sleeve to the respective bearing parts.

2. The power-transmitting device substantially herein described, consisting of a fixed hub part having supporting-arms and a tubular bearing part transversely of said armed hub part, a shaft mounted to rotate in said tubular part and having a pinion, a sleeve loosely mounted on one of said hub-arms and having a gear-wheel engaging the shaft-pinion, and a sprocket-wheel, the said tubular bearing part and the said gear-sleeve being fitted with roller-bearings upon which the said shaft and the said sleeve are suitably secured.

NATHANIEL ROE.

Witnesses:
 JOHN J. ROE,
 LORIN M. OVERTON.